(12) United States Patent
Taylor et al.

(10) Patent No.: US 6,323,972 B1
(45) Date of Patent: Nov. 27, 2001

(54) REAL-TIME ANALOG CREATION OF HOLOGRAPHIC FOURIER TRANSFORM MATCHED FILTERS

(75) Inventors: Travis S. Taylor, Somerville; Don A. Gregory; Peter S. Erbach, both of Huntsville, all of AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/687,158

(22) Filed: Oct. 16, 2000

(51) Int. Cl.$^7$ ..................................................... G03H 1/04
(52) U.S. Cl. .............................. 359/35; 359/2; 359/561; 356/71
(58) Field of Search .............................. 359/1, 2, 29, 35, 359/561; 356/71

(56) References Cited

U.S. PATENT DOCUMENTS

| | | | |
|---|---|---|---|
| 5,239,595 | * 8/1993 | Takemura et al. | 359/561 |
| 5,245,402 | 9/1993 | Adachi | 356/124 |
| 5,710,722 | 1/1998 | Wood | 364/525 |
| 6,002,499 | * 12/1999 | Corboline et al. | 359/561 |

* cited by examiner

*Primary Examiner*—Darren Schuberg
(74) *Attorney, Agent, or Firm*—Arthur H. Tischer; Freddie M. Bush

(57) ABSTRACT

A method is disclosed by which filters are created optically in real time—and tested. This technique is made possible by recent advances in Charge Couple Detector (CCD) detector array technology. Pixel (picture element) size has decreased to the point that real fringes can be detected and displayed. The fringes result from the interference of the optical Fourier transform of a displayed scene with a specified plane wave. Phase information is thus preserved. This is the critical information required in producing a hologram or a holographic matched filter.

2 Claims, 1 Drawing Sheet

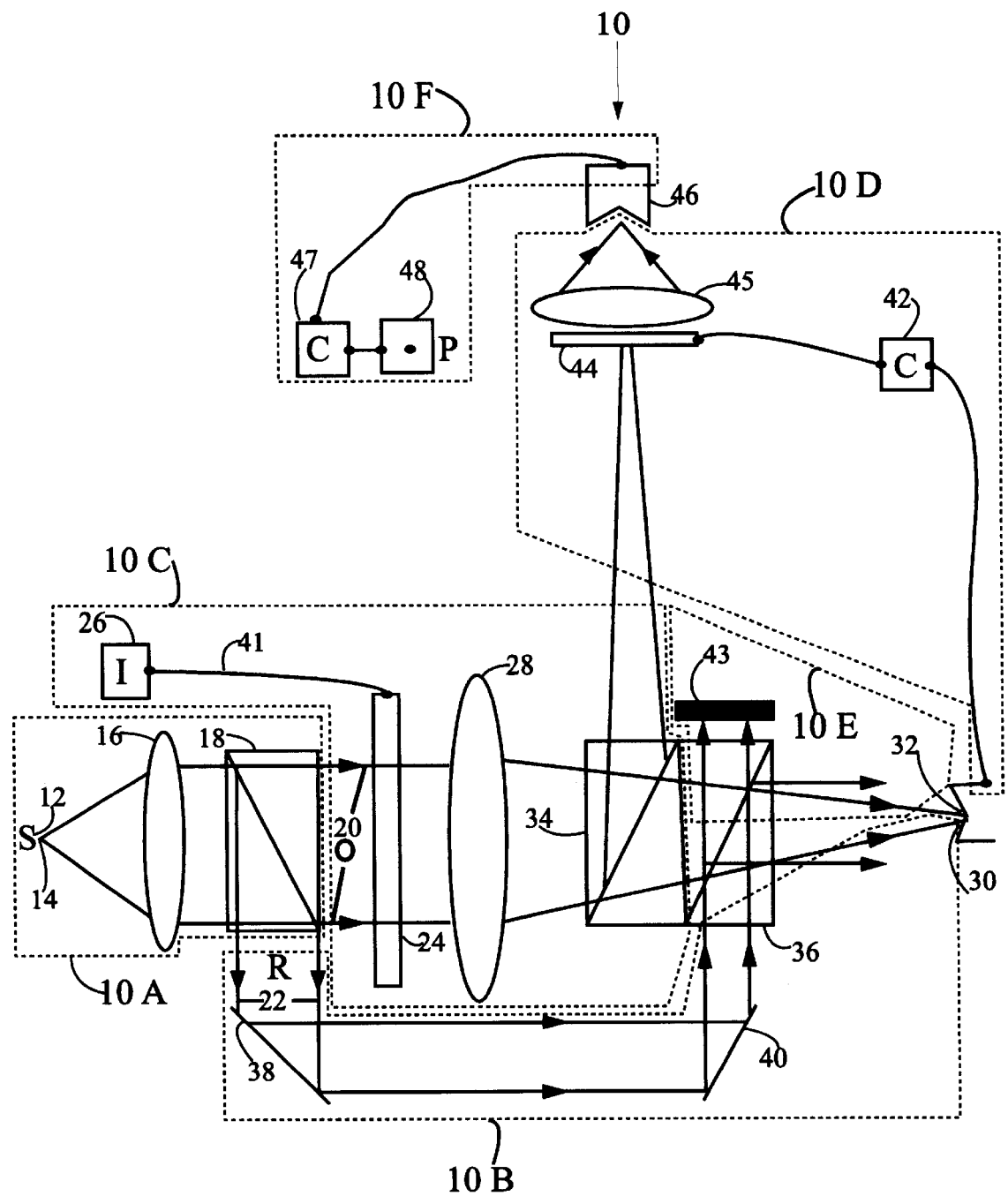

REAL-TIME ANALOG CREATION OF HOLOGRAPHIC FOURIER TRANSFORM MATCHED FILTERS

DEDICATORY CLAUSE

The invention described herein may be manufactured, used, and licensed by or for the Government for governmental purposes without the payment to us of any royalties thereon.

BACKGROUND OF THE INVENTION

Traditionally, optical matched filters for pattern recognition applications were produced using two techniques. The first technique employed holographic interferometric architectures similar to the Mach-Zehnder arrangement., The optical Fourier transform, produced by a lens, was interfered with an off-axis plane carrier light wave. This technique has come to be called the Vander Lugt architecture.

In the xf-yf plane, the off-axis plane wave reference beam interferes with the Fourier transform of the input transparency. The phase profile of the reference wave projected onto the flat xf-yf plane is wedge shaped, so that straight fringes are recorded at the location of each spatial frequency component of the in put scene. These fringes behave as microscopic diffraction gratings when illuminated by the Fourier transform of a test scene, and indicate the presence of the original input scene. This type of filter was originally made using photographic emulsion to record the interference pattern. A high-resolution medium was required for recording the fringes that were typically a few wavelengths wide. Once the film was exposed and then developed, it would be placed back in the system. If the input now used to address the filter exactly matched the spatial frequency information in the filter, the reference beam would be recreated from each exposed area. This collection of plane waves was then typically Fourier-transformed by another lens, resulting in the correlation function.

The second technique for producing matched filters involved digitally computing the Fourier transform of the scene of interest, which in general contains both amplitude and phase information, then taking the complex conjugate of the function and displaying the result on an electrically addressable spatial light modulator. The correlation can be directed off-axis if a prescribed phase ramp can be included in the calculation. The most serious problem with this technique is in finding a suitable device for displaying the computed filter. Currently, a device having arbitrary amplitude and phase addressability does not exist. Researchers have been forced to use approximate filters or filters that modulate only phase with an uncontrollable amplitude.

An object of this invention is to perform the complex filter computation optically, and immediately test it—thereby avoiding the time consuming digital calculation and complications involved with photographic emulsions.

SUMMARY OF THE INVENTION

The figure of the drawing depicts a sketch of the coherent optical system used in creating and testing of holographic Fourier transform matched filters of this invention. The light source 12 is a laser for producing coherent monochromatic light that is suitably expanded and collimated with a pinhole 14 and lens 16. Beamsplitter 18 divides the incident light beam into object and reference waves, shown as 20 and 22 respectively. The object wave passes through a spatial light modulator 24 that displays the input image 26, supplied by a camera, computer, or other video equipment. This spatial light modulator may modulate the amplitude or the phase of the coherent lighter a combination of amplitude and phase. Lens 28 performs the Fourier transform of the encoded scene. This information falls on the detector 30. The reference wave, labeled 22 in the figure, is also directed using mirrors 38 and 40, along with beamsplitter 36, onto detector 30 at a slight angle, thus providing the needed phase wedge for interference with the Fourier transform of the input scene. Detector 30 then records a series of interference fringes whose spacing is primarily determined by the reference beam angle and wavelength of the coherent light. The distance (d) between bright (or dark) fringes is given by:

$$d = \frac{\lambda}{\sin\theta}$$

for two plane waves intersecting at an angle θ. This produces a fringe spacing of 18.0 microns. This is within the detectable range of current state of the art CCD arrays. This array of fringe information is stored by the first computer 42, via a framegrabber, and then becomes the filter displayed spatial light modulator 44 that is itself addressed using beamsplitter 34. Lens 45 then Fourier transforms the field transmitted by spatial light modulator 34 thus producing the correlation at detector 46 (shown as point P or 48 in the figure), which is stored in the second computer 47. In reality, the lens 45 creates three terms: the correlation (point P), the convolution, and the filter response. With an off-axis (by the amount of θ) placement of detector 46, the correlation alone can be detected.

BRIEF DESCRIPTION OF THE DRAWING

The FIGURE of the drawing depicts a sketch of the coherent optical system used in creating and testing holographic Fourier transform matched filters of this invention.

DESCRIPTION OF THE PREFERRED EMBODIMENT(s)

Table 1 below lists the elements employed in the real-time analog creation of holographic Fourier transform matched filters. This table also lists the input to and output from these elements with a functional statement thereof. This Table and Table 2 presented later will enable a better understanding of the invention to be achieved since a better comprehension of the elements along with their functional relationships can be derived by following the teachings of these tables.

TABLE 1

| Element or item or Identify | Input | Output |
|---|---|---|
| Element 12 - A LASER LIGHT SOURCE: | Produces coherent monochromatic light | To elements 14 & 16 |
| Element 14 - A PIN HOLE: | Receives coherent monochromatic light and expands light | To element 16 |
| Element 16 - A FIRST LENS: | Collimates expanded light | To element 18 |
| Element 18 - A FIRST BEAMSPLITTER: | Divides the incident light into object and reference light | |
| Element 20 - AN OBJECT WAVE O: | Receives object wave from Element 18 | To element 24 & element 28 |
| Element 22 - A REFERENCE WAVE R: | Receives reference wave from 18 | To first mirror 38 & second mirror 40 |
| Element 24 - A FIRST SPATIAL LIGHT MODULATOR: | Receives object wave output from element 18 | To element 28 & 34 |
| Element 26 - AN INPUT IMAGE: | Displays input image in element 26 | To element 24 |
| Element 28 - A SECOND LENS: | Performs the Fourier transform of the encoded scene | To element 34 |
| Element 30 - A FIRST DETECTOR: | Fourier transform of encoded scene as first function | To element 32 |
| Element 32 - THE FIRST DETECTOR: | Receives reference wave from element 36 | To element 41 |
| Element 34 - A SECOND BEAMSPLITTER: | Receives output from element 28 | |
| Element 36 - A THIRD BEAMSPLITTER: | Receives reference wave output From element 40 | To element 41 |
| Element 38 - A FIRST MIRROR: | Receives reference wave output from Element 18 | To element 40 |
| Element 40 - A SECOND MIRROR: | A rotatable mirror which allows reference wave output to strike element 32 at a slight angle, thus providing the needed phase wedge for interference with the Fourier transform of the input scene. | To element 36 and element 32 |
| Element 41 - Input image: | This can be inputed from a computer, a camera, or other video equipment. | To element 24 |
| Element 42 - A FIRST COMPUTER: | Stores an array of fringe information via framegrabber | To element 44 |
| Element 43 - A BEAM BLOCK: | | |
| Element 44 - A SECOND LIGHT MODULATOR: | Receives input from element 42 And beamsplitter element 34 | |
| ELEMENT 45 - A THIRD LENS: | Fourier transforms the field transmitted by element 44 as combined with output from element 47. | To element 46. |
| ELEMENT 46 - A SECOND DETECTOR: | correlation is produced | To element 47 |
| Element 47 - A SECOND COMPUTER: | Stores the correlation produced at detector element 46 which is shown as element 48, correlation point. | |
| Element 48 - A CORRELATION POINT P: | | |

Table 2 below lists the elements of the real-time analog creation of holographic Fourier transform matched filters. This table provides a functional statement with description of each element whereas Table 1 provides inputs and outputs of elements and interaction between elements as applicable to provide a better appreciation of the invention

TABLE 2

Elements defined in terms of function

Element 12 - A LASER LIGHT SOURCE: Produces coherent monochromatic light.
Element 14 - A PIN HOLE: Receives coherent monochromatic light and expands it.
Element 16 - A FIRST LENS: Collimates expanded light.
Element 18 - A FIRST BEAMSPLITTER: Divides the incident light into object (O) and reference light (R).
Element 20 - AN OBJECT WAVE O: Receives object light from first beam splitter.
Element 22 - A REFERENCE WAVE R: Receives reference light from first beam splitter.
Element 24 - A FIRST SPATIAL LIGHT MODULATOR: Receives object wave output from first beam splitter.

TABLE 2-continued

Elements defined in terms of function

Element 26 - AN INPUT IMAGE: Displays input image in element 26.
Element 28 - A SECOND LENS: Performs the Fourier transform of the encoded scene.
Element 30 - A FIRST DETECTOR: Receives Fourier transform of encoded scene as first function.
Element 32 - THE FIRST DETECTOR: Receives reference was from third beam splitter.
Element 34 - A SECOND BEAMSPLITTER: Receives output from second lens which performs the Fourier transform of the encoded scene.
Element 36 - A THIRD BEAMSPLITTER: Receives reference wave output from rotatable mirror.
Element 38 - A FIRST MIRROR: Receives reference wave output from first beam splitter.
Element 40 - A SECOND MIRROR: Rotatable mirror which allows reference wave output to strike first detector at a slight angle.
Element 41 - An input image: This can be inputed from element 26, a computer, a camera, or other video equipment
Element 42 - A FIRST COMPUTER: Stores an array of fringe information via framegrabber.

TABLE 2-continued

Elements defined in terms of function

Element 43. - A BEAM BLOCK: Blocks wave or beam.
Element 44 - A SECOND LIGHT MODULATOR: Receives input from first computer and beam splitter element.
Element 45 - A THIRD LENS: Fourier transforms the field transmitted by second light modulator as combined with correlation point P.
Element 46 - A SECOND DETECTOR: Correlation is produced
Element 47 - A SECOND COMPUTER: Stores the correlation produced at second detector which is shown as correlation point P.
Element 48 - A CORRELATION POINT P: Term created by third lens that also creates the convolution, and the filter response.

With further reference to the drawing, the real-time analog creation of holographic Fourier transform matched filters is best understood by reviewing subsystems 10A–-10F.

Subsystem 10 A comprises a laser light source 12, a keyhole 14, a first lens 16, and a first beamsplitter 18. Table 1 lists the elements by number and name with an input and output relationship. Table 2 lists the elements and defines them in terms of their functions. Lens 16 collimates the expanded light with an output to 18 the first beamsplitter.

Subsystem 10 B receives reference wave R or 22 from beamsplitter 18. Subsystem 10 B comprises a first mirror 38 that receives reference wave 18. The first mirror 38 transmits this reference wave output to a rotatable mirror 40 which allows reference wave output to a third beamsplitter 36 to subsequently strike element 30 of the first detector. Because of the divided functions of the first detector, the elements number 30 and 32 are shown as elements of the first detector.

Subsystem 10 C receives object wave O or 22 from beamsplitter 18. An input image 41 from a source 26 which can be supplied by a camera, computer, or other video equipment is outputted to element 24, a first spatial light modulator, which outputs to element 28, a second lens. The first modulator may modulate the amplitude or the phase of the coherent light—or a combination of amplitude and phase. A second beamsplitter 34 receives output from second lens element 28 that performs the Fourier transform of the encoded scene or input image. This information falls on element 32 of first detector.

As noted earlier under subsystem 10 B, the reference wave 22 is directed using mirrors 38 and 40, along with third beamsplitter 36, onto detector 30 at a slight angle, thus providing the needed phase wedge for interference with Fourier transform of the input scene. Detector element 32 then records a series of interference fringes whose spacing is primarily determined by the reference beam angle and the wavelength of the coherent light. The distance between bright (Or dark) fringes is given by $$d = \frac{\lambda}{\sin\theta}$$

for two waves intersecting at an angle $\theta$. Typical parameters might be $\lambda = 0.63 \times 10^{-6}$ m and $\theta = 2$ degrees. This produces a fringe spacing of 18 microns. This is within the detectable range of current state of the art charge couple device arrays.

Subsystem 10 D comprises a first computer 42 that stores an array of fringe information via a framegrabber (not shown), and then becomes the filter displayed on a second light modulator 44, which is itself addressed using beamsplitter 34. Lens 45 then Fourier transforms the filed transmitted by the second light modulator 44—thus producing the correlation at detector 46 (shown as point P in the figure) that is stored in the second computer 47.

Subsystem 10 E comprises beam block 43 which blocks waves from beamsplitter 36 that are not transmitted to detector 32.

Subsystem 10 F comprises a second computer 47 that stores the correlation produced at detector element 46 that is shown as element 48, or correlation point P. In reality, three terms are created by lens 45: the correlation (point P), the convolution, and the filter response. With an off-axis (by an amount $\theta$) placement of detector 46, the correlation alone can be detected.

Optical correlators have a wide variety of applications in both civilian and military programs. Target recognition and tracking as well as aim point selection and missile guidance are a few of the military applications. Civilian uses include fingerprint identification, security systems, and many others. The advantage of the systems described in this disclosure is that filters can be created in near real time from actual objects of interest. As the object changes due to rotation, scale or aspect angle, filters can be created to compensate. This should make optical correlators much more adaptable to various realistic situations.

We claim:

1. A real-time analog creation of holographic Fourier transform matched filters comprising:

(A) a first subsystem (10 A) which comprises a laser light source, a keyhole, a first lens, and a first beamsplitter, said laser light source producing a coherent monochromatic light which is received and expanded by said keyhole, said keyhole outputting said expanded light to said first lens collimating said expanded light and outputting said collimated light to a first beamsplitter, said first beamsplitter dividing said collimated light into an object wave of light and a reference wave of light;

(B) a second subsystem (10 B) which comprises a first mirror, a rotatable second mirror, a third beamsplitter, and a first detector, said first mirror receiving said reference wave of light and transmitting same to said rotatable mirror which outputs said reference wave to a third beamsplitter which allows said reference wave to strike an element of a first detector at a slight angle thus providing the needed phase wedge for interference with Fourier transform of subsequently supplied input scene;

(C) a third subsystem (10 C) which comprises a first spatial light modulator, a second lens, a second beamsplitter, a source for an input image which can be supplies by a camera, a computer, or other video equipment, and an input image, said first spatial light modulator receiving an input image from said source for an input image and outputting to said second lens that performs the Fourier transform of the input image and said second beamsplitter which outputs a portion of said object wave and said Fourier transform of input image to strike element of first detector, and said portion of output wave also being transferred to a second light modulator;

(D) a fourth subsystem (10 D) which comprises a first computer for storing an array of information via a framegrabber, a second light modulator for receiving input from said first computer, a third lens that Fourier transforms the field transmitted by said second light modulator as combined with correlation point, and a second detector where correlation is produced;

(E) A fifth subsystem (10 E) which comprises a beam block that blocks waves transmitted from said third beamsplitter that are not transmitted to detector; and, (F) A sixth subsystem (10 F) which comprises a second computer which stores the correlation produced at said second detector.

2. The real-time analog creation of holographic Fourier transform matched filters as defined in claim 1 wherein holographic matched filters are produced.

* * * * *